OUTPUT OF LOCAL DECODER CIRCUIT

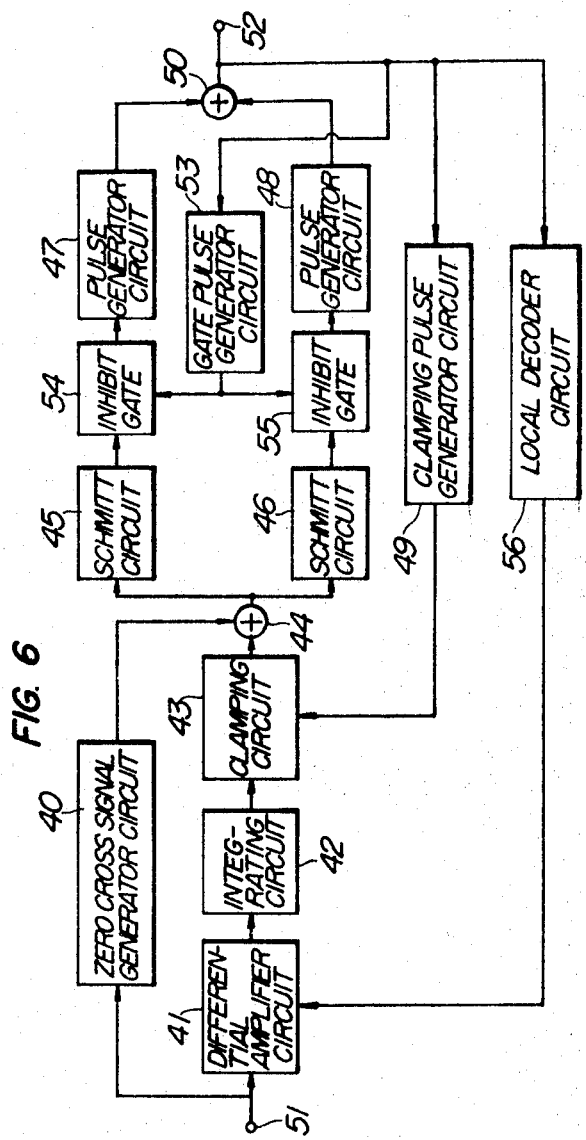

POSITIVE THRESHOLD LEVEL
NEGATIVE THRESHOLD LEVEL

United States Patent Office 3,467,876
Patented Sept. 16, 1969

3,467,876
PULSE MODULATION SYSTEM
Yoshinobu Tatsuzawa, Daito-shi, Kosaku Uchida, Neya-gawa-shi, and Kazuaki Mayumi, Kyoto, Japan, assignors to Matsushita Electric Industries Co., Ltd., Osaka, Japan, a corporation of Japan
Filed Dec. 6, 1967, Ser. No. 688,506
Claims priority, application Japan, Dec. 9, 1966, 41/81,733, 41/81,734
Int. Cl. H03k 17/02, 3/04, 5/20
U.S. Cl. 328—150                                  8 Claims

ABSTRACT OF THE DISCLOSURE

This specification discloses a pulse modulation system, wherein a positive modulation pulse is generated when an area defined by a deviation in an input sound signal voltage and the time axis reaches a predetermined positive value and when the input signal voltage crosses the zero level while increasing, and a negative pulse is generated when an area defined by a deviation in the input signal voltage and the time axis reaches a predetermined negative value and when the input signal voltage crosses the zero level while decreasing.

---

This invention relates to a pulse modulation system, and more particularly it pertains to a pulse modulation system called area delta and zero cross modulation system which is improved in respect of articulation and naturalness by skillfully adding pulses representing amplitude information of a sound signal to the zero cross modulation and meets all the requirements of a pulse modulation system for use with the random-access discrete-address system.

Recently, attention has been paid to the nonsynchronous multiplex communications system (normally, random-access discrete-address system, hereinafter called "RADAS"). As to the generic concept of RADAS, refer to "Introduction to Random-Access Discrete-Address System" by C. H. Dawson, IEEE International Convention Record 1964, part 6, page 154, and U.S. patent specification No. 3,197,563 to D. H. Hamsher, W. L. Branch, H. W. Parmer, etc. entitled "Nonsynchronous Multiplex Communications System."

One of the problems with the RADAS is the outbreak of false addresses. Either the number of simultaneously speaking stations or the number of pulses per station should be reduced in order to minimize the occurrence of false address. Also, it is necessary to adopt a communications system which is substantially not badly affected by noise. However, reduction in the number of simultaneously speaking stations does not lead to effective utilization of the frequency bandwidth. In an attempt to reduce the number of pulses per station, it is essential to realize a pluse modulation system with a smaller number of pulses representing sound information. In addition, it is required that the pulse interval of the modulation output pulse train be great to ensure address information. In short, the requirements of a pulse modulation system for use with nonsynchronous multiplex communications system are: (a) the number of pulses representing sound information be minimized, (b) the demodulation characteristics be substantially not badly affected by interference pulses, and (c) the pulse interval of the modulation output pulse train be great.

Among pulse modulation systems with a smaller number of pulses representing sound information is the zero cross modulation system (or the constant level cross modulation system), which is a modulation system wherein a pulse is generated whenever a sound signal voltage crosses the zero level (or a constant level). However, such system is very poor in respect of the naturalness of a demodulated sound, since information concerning the sound signal amplitude is not extracted. Furthermore, this system is inherently susceptible to noise, and its speech quality is remarkably deteriorated by interference pulses. On the other hand, in the case of the nonsynchronous three-level delta modulation system, its naturalness is excellent, but the number of pulses representing sound information is great. That is, in order to extract those portions (mainly, consonant portions) of a sound signal which have lower amplitudes and greatly contributes to articulation, it is necessary to make the quatization unit small. This implies that a large number of pulses occur in higher amplitude portions (mainly, vowel portions).

Accordingly, it is a primary object of this invention to provide a pulse modulation system capable of meeting all the requirements of a pulse modulation system for use with the nonsynchronous multiplex communications system.

Another object of this invention is to provide a pulse modulation system comprising means for determining variations in an input signal voltage from that at the point of time when a preceding pulse was generated, means for integrating said variations with respect to time, means for extracting zero cross points of said input signal voltage (or cross points at a predetermined constant level), and means for generating a pulse at a point of time when said integration reaches a predetermined constant value and at each zero cross point of said input signal voltage (or each cross point at said predetermined constant level).

Another object of this invention is to provide a pulse modulation system comprising means for forming a stepped wave from an output pulse train, means for integrating the difference between an input signal voltage and said stepped wave with respect to time, means for extracting zero cross points of the input signal voltage (or cross points at a predetermined constant level), and means for generating a pulse at a point of time when said integration reaches a predetermined value and at each zero cross point of said input signal voltage (or each cross point at the predetermined constant level).

A further object of the invention is to provide a pulse modulation system comprising means for determining variations in an input signal voltage from that at the point of time when a preceding pulse was generated, and means for extracting zero cross points of the input signal voltage (or cross points at a predetermined constant level), and means for generating a pulse at the point of time when each of said variations reaches a predetermined value and at the point of time when each of said zero cross points is extracted.

A still further object of this invention is to provide a pulse modulation system comprising means for forming a stepped wave from an output pulse train, means for determining the voltage difference between an input signal voltage and said stepped wave, means for extracting zero cross points of said input signal voltage (or cross points at a predetermined constant level), and means for generating a pulse at the point of time when said voltage difference reaches a predetermined value and at the point of time when each of said cross points is extracted.

The specific nature of the present invention as well as other objects, effects and advantages thereof will become apparent from the following description of typical embodiments of the invention illustrated in the accompanying drawings, in which:

FIG. 6 is a block diagram showing the case where the arrangement of FIG. 4 is slightly modified.

Figure 1A:
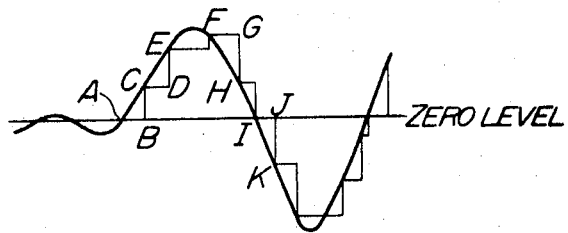
FIGS. 1a to 1d are views showing signal waveforms useful for explaining the operational principle of the area delta and zero cross modulation (hereafter, called AD0X modulation) system according to an embodiment of the present invention.

With reference to FIGS. 1a to 1d, description will first be made of the ADOX modulation. Assume that the input sound signal voltage is as shown in FIG. 1a. When the sound signal voltage crosses the zero level (or a predetermined level close to the zero level) while increasing, positive pulses ($P_{01}$, $P_{03}$, $P_{05}$ in FIG. 1d) are generated at the cross points, and when the sound signal voltage crosses said level while decreasing, negative pulses ($P_{02}$, $P_{04}$ in FIG. 1d) are generated. The pulse train $P_{01}$, $P_{02}$, $P_{03}$, $P_{04}$, $P_{05}$ thus generated is the zero cross modulation output pulse train. In case the sound signal has a high amplitude, an area defined by the increment (positive value) of the signal voltage and the time axis (ABC in FIG. 1a) is counted from the point of time when a pulse is generated, and when the area reaches a predetermined value, a positive pulse $P_{a1}$ is generated. Subsequently, an area CDE defined by the increment of the signal voltage and the time axis is counted, and when this area reaches a predetermined value, a positive pulse $P_{a2}$ is generated. The "increment" referred to above means an increase in the signal voltage over that at the point of time when the preceding pulse was generated, and the "time axis" referred to above means a level passing through the reference voltage for the increment in parallel with the zero level. In case the signal voltage decreases, areas FGH, IJK and so forth defined by the decrements (negative values) of the signal voltage and the time axis are counted and when these areas reach a predetermined value, negative pulses $P_{a4}$, $P_{a5}$ and so forth are generated. The "decrement" referred to above means a decrease in the signal voltage relative to that at the point of time when the preceding pulse was generated. Pulse train $P_{01}$, $P_{02}$, $P_{03}$, $P_{a1}$, $P_{a2}$, $P_{a3}$, $P_{a4}$, $P_{04}$, $P_{05}$ ... (FIG. 1d) obtained by combining the pulse generated in the above manner with the zero cross modulation pulse train is the ADOX modulation output pulse train.

Figure 1B:
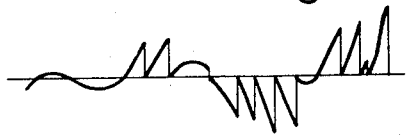
Figure 1C:
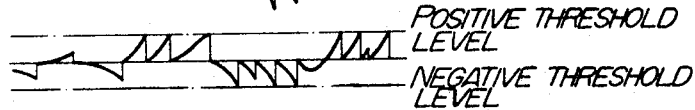
Figure 1D:
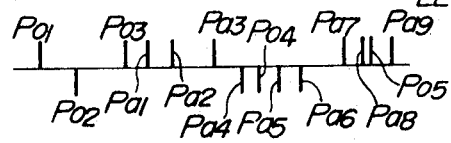
Figure 2:
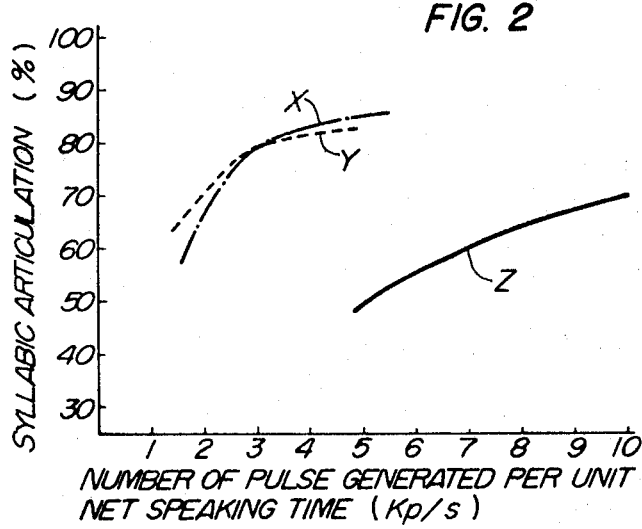
FIG. 2 is a view showing the results of syllabic articulation measured with respect to the area delta and zero cross modulation, zero cross modulation and nonsynchronous three-level delta modulation.

In the case of the ADOX modulation the following operation is performed. That is, the sound signal is clamped to the zero level by the preceding pulse so that there is produced such an error signal voltage as shown in FIG. 1b. A clamping pulse is also generated at a point of time when the sound signal voltage crosses the zero level. In such case, however, the error signal voltage is not affected since the sound signal voltage is zero. Subsequently, the error signal voltage as shown in FIG. 1b is integrated to be converted to an error area voltage (FIG. 1c) proportional to the area defined by the error signal voltage and the time axis. When the resultant error area voltage reaches a predetermined positive threshold level, a positive pulse is generated. On the other hand, a negative pulse is generated when the error area voltage reaches a predetermined negative threshold level equal in magnitude to the aforementioned positive threshold level. Such pulses are combined with zero cross pulses generated in a different portion so that the ADOX modulation output pulses are obtained as shown in FIG. 1d. At the same time, a clamping pulse generator is triggered. The error signal voltage and error area voltage are clamped to the zero level by the clamping pulse. Thus, the ADOX modulation output pulses are of positive polarity when the sound signal voltage crosses the zero level while increasing and when the increment of the sound signal voltage relative to that at points of time when the preceding pulses were generated reaches the positive threshold, while they are of negative polarity when the sound signal voltage crosses the zero level while decreasing and when the decrement (negative error area voltage) of the sound signal voltage relative to that at the point of time when the preceding pulse is generated reaches the negative threshold. In order to transmit such ADOX modulation output pulses by the RADAS, use two distinguishable address informations depending upon the polarity of the pulses. That is, two types of address information are assigned to the respective RADAS stations. FIG. 2 shows the results of syllabic articulation measured with respect to the ADOX modulation, zero cross modulation and nonsynchronous three-level delta modulation, wherein X represents the case of the ADOX modulation, Y denotes the case of the zero cross modulation, and Z indicates the case of the nonsynchronous three-level delta modulation. As will be seen from these results, an increase in the number of generated pulses is slight in the case of the ADOX modulation as compared with that in the case of the zero cross modulation, so that in the case of ADOX modulation, naturalness of sound can successfully be improved over that in the case of the zero cross modulation. Also, an increase in the number of generated pulses in the case of the ADOX modulation is much smaller than that in the case of the nonsynchronous three-level delta modulation. The number of pulses generated per unit net speaking time described in FIG. 2 is defined by $$\frac{\text{Total number of generated pulses}}{(\text{Speech time}) - (\text{Pause time})}$$

where the pause time refers to the time when no sound signal voltage is present due to word interval, breathing or the like.

Figure 3:
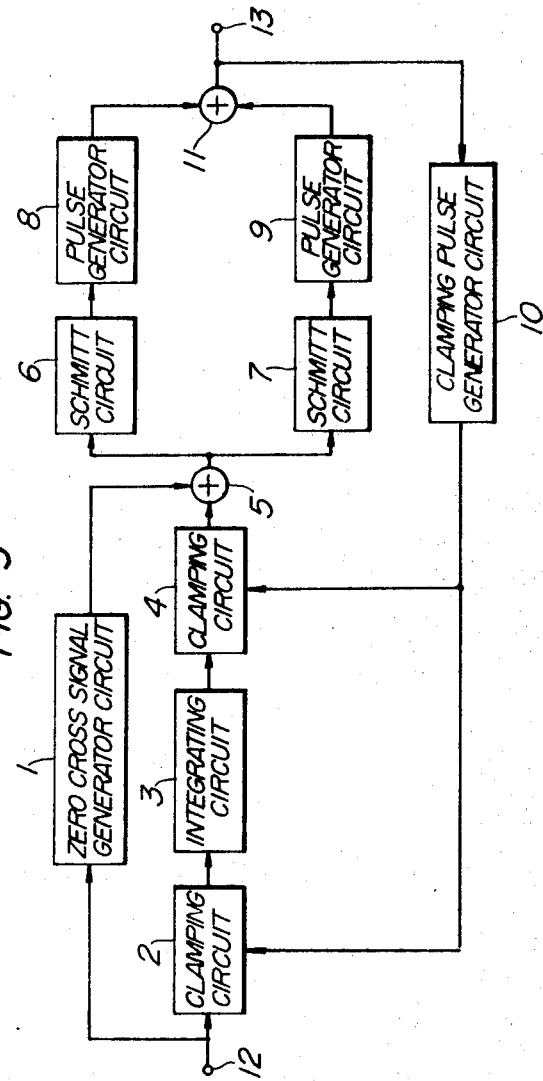
FIG. 3 is a block diagram showing the basic form of area delta and zero cross modulation.

FIG. 3 shows the basic arrangement of the ADOX modulator. In FIG. 3, the reference numeral 1 represents a zero cross signal generator circuit, 2 a clamping circuit for producing an error signal voltage, 3 an integrating circuit for integrating said error signal voltage, 4 a clamping circuit for producing an error area voltage, 5 and 11 adder circuits for combining two signals with each other, 6 a Schmitt circuit with a positive threshold level, 7 a Schmitt circuit with a negative threshold level, 8 a positive pulse generator circuit, 9 a negative pulse generator circuit, 10 a clamping pulse generator circuit, 12 an input terminal of the ADOX modulator, and 13 an output terminal.

Description will now be made of the operation of the ADOX modulator with reference to FIG. 3 and FIGS. 1a to 1d. The sound signal voltage (FIG. 1a) arriving at the input terminal 12 of the ADOX modulator is supplied to the zero cross signal generator circuit 1 and clamping circuit 2 by way of the line 12-1 (this line corresponds to the line connecting the input terminal 12 and the zero cross signal generator circuit 1; likewise hereinafter) and line 12-2, respectively. The sound signal voltage (FIG. 1a) supplied to the zero cross signal generator circuit 1 is converted thereby to a pulse train ($P_{01}$, $P_{02}$, $P_{03}$, $P_{04}$, $P_{05}$ in FIG. 1d) including pulses with positive polarity ($P_{01}$, $P_{03}$, $P_{05}$ in FIG. 1d) which are generated when the sound signal voltage crosses the zero level or a predetermined level close to the zero level while increasing and pulses with negative polarity which are generated when the sound signal voltage crosses the zero level or the predetermined level close to the zero level while decreasing, so as to be supplied to the adder circuit 5 by way of the line 1–5. On the other hand, the sound signal voltage (FIG. 1a) supplied to the clamping circuit 2 is clamped thereby to the zero level every time when clamping pulses are generated which are applied to the clamping circuit by way of the line 10–2, so as to be converted to the error signal voltage (FIG. 1b). The error signal voltage is supplied to the integrating circuit 3 by way of the line 2–3 so as to be integrated. The integrated error signal voltage is in turn supplied to the clamping circuit 4 so as to be clamped to the zero level and then converted to the error area voltage (FIG. 1c) which is in turn supplied to the adder circuit 5 by way of the line 4–5. In this adder circuit 5, the zero cross signal supplied thereto by way of the line 1–5 and the error area voltage applied thereto by way of the line 4–5 are combined with each other, and the combined signal is supplied to the Schmitt circuits 6 and 7 through the lines 5–6 and 5–7. The Schmitt circuit 6 drives the pulse generator circuit 8 coupled thereto by way of the line 6–8 when the signal supplied to the former by way of the line 5–6 (the composite signal of the zero cross signal and error area signal) exceeds the positive threshold level. On the other hand, the Schmitt circuit 7 drives the pulse generator circuit 9 coupled thereto by way of the line 7–9 when the signal supplied to the former by way of the line 5–7 (the composite signal of the zero cross and error area signal )exceeds the negative threshold level. The positive and negative threshold levels are equal in magnitude to each other. That the composite signal "exceeds the threshold level" means that the magnitude (absolute value) of the input signal voltage exceeds the absolute value of the threshold level while increasing. The pulse generator circuits 8 and 9 are driven by the Schmitt circuits 6 and 7 respectively and adapted to generate, when driven, a pulse with positive polarity and with negative polarity respectively. The respective pulses are supplied to the adder circuit 11 by way of the lines 8-11 and 9-11 and combined with each other by the adder circuit 11 so as to be converted to the AD0X modulation output pulse train (FIG. 1d). These pulses are sent to the output terminal 13 of the AD0X modulator by way of the line 11–13, and simultaneously they are supplied to the clamping pulse generator circuit 10 by way of the line 11–10 to drive the circuit 10. In the presence of an input pulse, the clamping pulse generator circuit 10 generates a predetermined pulse irrespective of the polarity of the input pulse, thereby driving the clamping circuits 2 and 4 by way of the lines 10–2 and 10–4. As described above, if such a sound signal voltage as shown in FIG. 1a is applied to the input terminal 12, an AD0X modulation output pulse train as shown in FIG. 1d is caused to appear at the output terminal 13.

Figure 4:
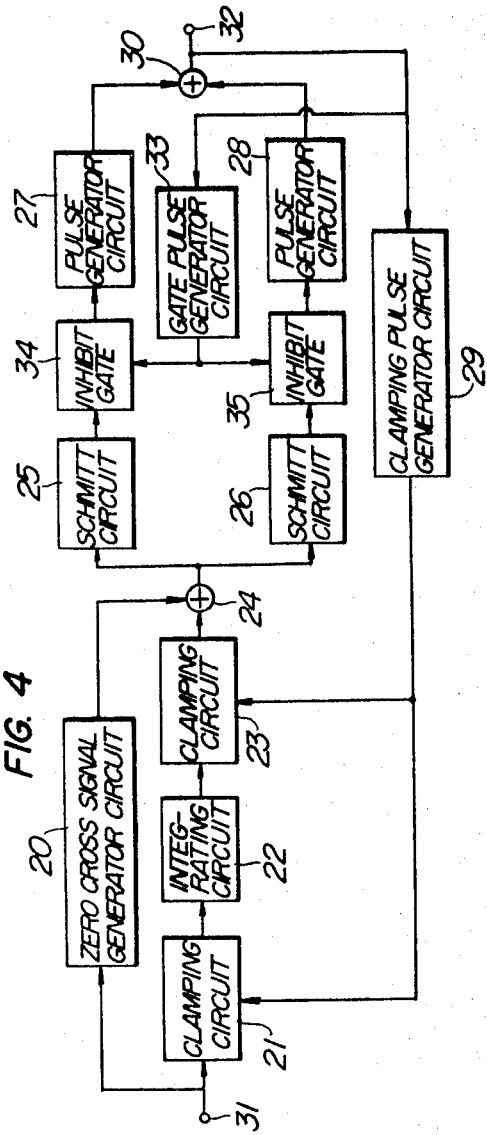
FIG. 4 is a block diagram showing the case where the modulator of FIG. 3 is provided with a pulse interval limiting function.

FIG. 4 shows a modification to the basic circuit arrangement of FIG. 3, wherein the pulse interval limiting function is added. In FIG. 4, the reference numeral 20 represents a zero cross signal generator circuit, 21 a clamping circuit for producing an error signal voltage, 22 an integrating circuit, 23 a clamping circuit for producing an error signal voltage, 24 and 30 adder circuits for combining two signals with each other, 25 a Schmitt circuit with a positive threshold level, 26 a Schmitt circuit with a negative threshold level, 27 a positive pulse generator circuit, 28 a negative pulse generator circuit, 29 a clamping pulse generator circuit, 31 a modulator input terminal, and 32 a modulator output terminal. The above arrangement performs the same operation as that in FIG. 3. The reference numeral 33 denotes a gate pulse generator circuit, 34 an inhibit gate, and 35 an inhibit gate. These three elements are additionally provided for the purpose of limiting the pulse interval.

Figure 5A:
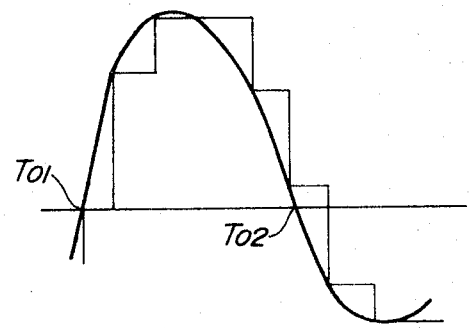
FIGS. 5a to 5f are views showing signal waveforms useful for explaining the operation of the arrangement as shown in FIG. 4.
Figure 5B:
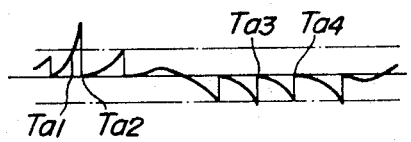
Figure 5C:
Figure 5D:
Figure 5E:
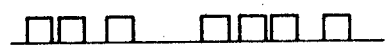
Figure 5F:
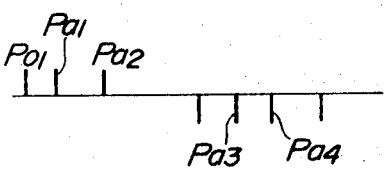

FIGS. 5a to 5f are views showing signal waveforms useful for explaining the operation of the arrangement shown in FIG. 4. FIG. 5a shows a sound signal voltage, FIG. 5b shows an error area voltage, FIG. 5c shows the output of the positive Schmitt circuit 25, FIG. 5d shows the output of the negative Schmitt circuit 26, FIG. 5e shows inhibit gate pulses, and FIG. 5f shows an AD0X modulation output pulse train wherein the pulse generation interval is limited.

Description will now be made of the pulse generation interval limiting function in connection with FIG. 4 and FIGS. 5a and 5f. The elements 20, 21, 22, 23, 24, 25, 26, 27, 28, 29, 30, 31 and 32 are the same as the elements 1, 2, 3, 4, 5, 6, 7, 8, 9, 10, 11, 12 and 13 and perform the same operations respectively. Only the operations of elements 33, 34 and 35 related to the pulse generation interval limiting function will be described hereinbelow. The gate pulse generator circuit 33 is driven by pulses applied thereto by way of the line 30–33, so as to generate inhibit pulses with a predetermined pulse width, which are in turn supplied to the inhibit gates 34 and 35 by way of the lines 33–34 and 33–35, respectively, thereby driving the inhibit gates 34 and 35. In the presence of a pulse on the line 33–34, the inhibit gate 34 prevents the signal on the line 25–34 from being delivered to the line 34–27 (that is, the line 25–34–27 is cut off). On the other hand, in the absence of a pulse on the line 33–34, the inhibit circuit 34 permits the signal on the line 25–34, to be sent to the line 34–27. Similarly, the inhibit gate 35 cuts off or connects the line 26–35–28 depending upon the presence or absence of a pulse on the line 33–35. The AD0X modulator including the elements operation as described above operates as follows.

If the sound signal voltage crosses the zero level at a point of time $T_{01}$ in FIG. 5a, then such voltage is converted by the zero cross signal generator circuit 20 to a cross signal which is in turn supplied by way of the line 20–24–25 to drive the positive Schmitt circuit 25. The output of the positive Schmitt circuit 25 is supplied by way of the line 25–34–27 to drive the pulse generator circuit 27 since the inhibit gate 34 is rendered inoperative due to the absence of a pulse on the line 33–34. Thus, the pulse generator circuit 27 produces a pulse with positive polarity, so that the pulse $P_{01}$ in FIG. 5f is sent out to the output terminal 32 by way of the line 27–30–32. Simultaneously, the pulse generated by the circuit 27 is supplied by way of the line 27–30–29 to drive the clamping pulse generator circuit 29, and it is also supplied by way of the line 27–30–33 to drive the gate pulse generator circuit 33. The output pulse of the clamping pulse generator circuit 29 is supplied to the clamping circuits 21 and 23 through the lines 29–21 and 29–23, respectively. The error signal voltage appearing on the line 21–22 is integrated by the integrator circuit 22 so as to be converted to the error area voltage (FIG. 5b) proportional to the area defined by the error signal voltage and the time axis. In this case, the positive Schmitt circuit 25 is rendered operative by the fact that the error area voltage integrated from the point of time $T_{01}$ reaches the threshold level of the positive Schmitt circuit 25 at a point of time $T_{a1}$ (FIG. 5b), but since the line 25–34–27 is cut off by the inhibit gate 34 due to the fact that the time interval $(T_{a1}-T_{01})$ is shorter than the predetermined pulse width of the output pulse (FIG. 5e) of the gate pulse generator circuit, the pulse generator circuit 27 cannot be driven by the output signal of the positive Schmitt circuit 25. At a point of time $T_{a2}$ (FIG. 5b) when the inhibit gate pulse vanishes or the pulse on the line 33–34 disappears, the pulse generator circuit 27 is driven to generate a pulse with positive polarity, which is in turn sent to the modulator output terminal 32. At the same time, the pulse generated by the circuit 27 is supplied by way of the line 27–30–29 to drive the clamping pulse generator circuit 29. Thus, the error area voltage can be determined from the point of time $T_{a2}$. By the same operation as mentioned above, the zero cross point $T_{02}$ (FIG. 5a) of the sound signal voltage is prevented from appearing in the modulation output since although the zero cross point $T_{02}$ is between the points of time $T_{a3}$ and $T_{a4}$, the former is so close to the latter that it is cut off by the inhibit gate 35. In this case, since the error area voltage (FIG. 5b) has not reached the negative threshold level, the pulse generator circuit 28 is stopped from operation even when the inhibit gate 35 is rendered conductive. Thus, at this time, the error area voltage can be determined, with the zero cross point neglected.

By the aforementioned arrangement, it is possible to obtain such an AD0X modulation output pulse train that no pulse is present in a smaller interval than a predetermined one.

FIG. 6 shows a modification to the arrangement of FIG. 4, wherein a differential amplifier circuit 41 is used instead of the clamping circuit 21, the line 29–21 is removed, and a local decoder circuit 56 and lines 52–56 and 56–41 are additionally provided. The other elements 40, 42, 43, 44, 45, 46, 47, 48, 49, 50, 51, 52, 53, 54 and 55 are so designed as to operate in the same manner as the elements 20, 22, 23, 24, 25, 26, 27, 28, 29, 30, 31, 32, 33, 34 and 35 of FIG. 4.

Figure 7A:
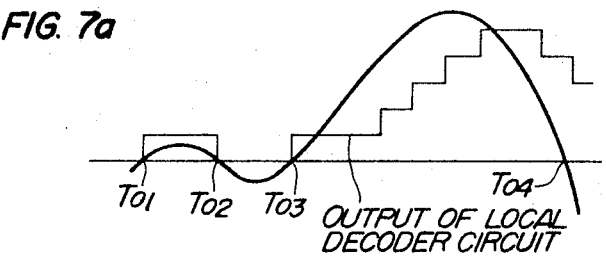
FIGS. 7a to 7d are views showing signal waveforms useful for explaining the operation of the arrangement as shown in FIG. 6.
Figure 7B:
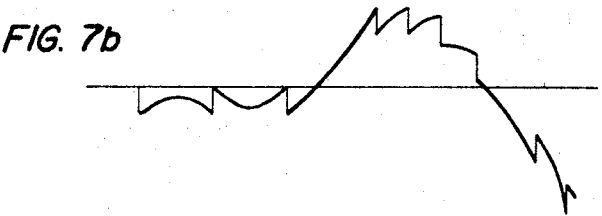
Figure 7C:
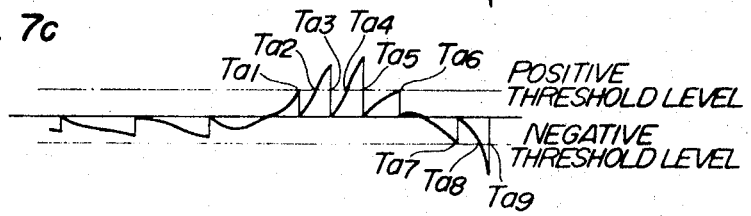
Figure 7D:
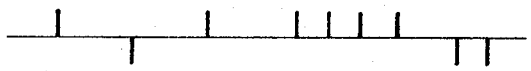

Description will now be made of the operation of the AD0X modulator including the local decoder circuit with reference to FIGS. 6 and 7. The local decoder circuit 56 is so designed as to increase the holding voltage by one unit voltage when a pulse arriving thereat by way of the line 52–56 is of positive polarity and decrease the holding voltage by one unit voltage when the arriving pulse is of negative polarity. Such holding voltage is applied to the differential amplifier circuit 41 by way of the line 56–41. The differential amplifier circuit 41 is adapted to supply the difference between the voltages appearing on its two input lines 51–41 and 56–41 to the integrating circuit 42 by way of the line 41–42. Assume that the sound signal voltage is as shown in FIG. 7a, and that the output signal voltage of the local decoder circuit 56 is zero. Then the sound signal voltage crosses the zero level at a point of time $T_{01}$ in FIG. 7a while increasing, and therefore it is supplied to the zero cross signal generator circuit 40 by way of the line 51–40 so as to be converted to a zero cross signal, which is in turn supplied by way of the line 40–44–45 to drive the Schmitt circuit 45. At this time, the inhibit gate 54 assumes the conductive state since no pulse is present on the line 53–54, so that the pulse generator circuit 47 is driven by the output of the Schmitt circuit 45. The output pulse of the pulse generator circuit 47 is taken out as the AD0X modulation output pulse by way of the line 47–50–52, and simultaneously it is supplied by way of the lines 47–50–49 and 47–50–56 to drive the clamping pulse generator circuit 49 and the local decoder circuit 56, respectively. The output pulse of the clamping pulse generator circuit 49 is supplied by way of the line 49–43 to drive the clamping circuit 43, thereby clamping the error area voltage (FIG. 7c) to the zero level. The output signal of the local decoder circuit 56 is supplied to the differential amplifier circuit 41 by way of the line 56–41 so that the difference between said output signal and the sound signal supplied to the differential amplifier circuit 41 by way of the line 51–41 is detected. Thus, an error signal voltage as shown in FIG. 7b is obtained as the output of the differential amplifier circuit 41. At the point of time $T_{02}$ in FIG. 7a, the error area voltage has not reached the negative threshold level as shown in FIG. 7c. Since, however, the sound signal crosses the zero level while decreasing, the sound signal is converted to a zero cross signal by the zero cross signal generator circuit 40. In the same way as above, an AD0X modulation output pulse with negative polarity is formed through the Schmitt circuit 46, inhibit gate 55 and pulse generator circuit 48. Thus, AD0X modulation output pulses are obtained. At a point of time $T_{a1}$ in FIG. 7c, the positive threshold level is reached by the error area voltage (FIG. 7c) to which the error signal voltage (FIG. 7b), that is, the difference between the output voltage of the local decoder circuit 56 supplied to the differential amplifier circuit 41 by way of the line 56–41 and the sound signal voltage supplied to the differential amplifier circuit 41 by way of the line 51–41 has been converted through the actions of the integrating circuit 42 and clamping circuit 43. As a result, a pulse with positive polarity is formed through the Schmitt circuit 45, inhibit gate 54 and pulse generator circuit 47, so as to be taken out as an AD0X modulation output pulse. At the point of time $T_{a2}$ (FIG. 7c), the error area voltage exceeds the positive threshold level, but the time interval ($T_{a2}-T_{a1}$) is so short that any AD0X modulation output pulse is prevented from being generated due to the actions of the gate pulse generator circuit 53 and inhibit circuit 54, as previously described. At a point of time $T_{a3}$ when the pulse generation interval limiting action (by the gate pulse generator circuit 53 and inhibit gate 54) is released, an output pulse is generated. This is also true of points of time $T_{a4}$, $T_{a5}$, $T_{a8}$, and $T_{a9}$. At a point of time $T_{04}$, the sound signal voltage crosses the zero level, but no modulation output pulse is generated at this cross point due to the pulse generation interval limiting function. By the action as described above, a modulation output pulse train as shown in FIG. 7d is obtained.

By eliminating the integrating circuit 42 and clamping circuit 43 to form the line 41–44 and removing the clamping pulse generator circuit 49 and lines 52–49 and 49–43, it is possible to obtain a modulation output pulse train which corresponds to that produced by a combination of the non-synchronous three-level delta modulation and the zero cross modulation.

In accordance with this invention, zero cross signals are contained so that even a sound signal with a very low amplitude can be extracted. Therefore, it is possible to make clear words starting and ending with a smaller number of output pulses. Also, the practical dynamic range for a sound signal voltage can be increased. Furthermore, the frequency of generation of modulation output pulses can be greatly lowered since articulation will not be deteriorated if the threshold level of the error area voltage is increased. By adding the pulse generation interval limiting function as in the arrangement of FIG. 6, it is possible to prevent the pulse generation interval from becoming shorter than a predetermined value. And yet, deterioration in articulation due to the interval limitation is very slight since this is not a case in which pulses occurring with short intervals are thinned out.

What is claimed is:

1. A pulse modulation system comprising means for determining variations in an input signal voltage from that at the point of time when a preceding pulse was generated, means for integrating said variations with respect to time, means for extracting zero cross points of said input signal voltage or cross points at a predetermined constant level, and means for generating a pulse at a point of time when said integration reaches a predetermined value and at each zero cross point of said input signal voltage or each cross point at the predetermined constant level.

2. A pulse modulation system as set forth in claim 1, wherein the output pulse generation interval is made longer than a predetermined value by means for cutting off lines for a predetermined period of time subsequent to the point of time when a preceding pulse was generated.

3. A pulse modulation system, comprising means for forming a stepped wave from an output pulse train, means for integrating the difference between an input signal voltage and said stepped wave with respect to time, means for extracting zero cross points of the input signal voltage or cross points at a predetermined constant level, and means for generating a pulse at a point of time when said integration reaches a predetermined value and at each zero cross point of said input signal voltage or each cross point of the predetermined constant level.

4. A pulse modulation system as set forth in claim 3, wherein the output pulse generation interval is made longer than a predetermined value by means for cutting off lines for a predetermined period of time subsequent to the point of time when a preceding pulse was generated.

5. A pulse modulation system, comprising means for determining variations in an input signal voltage from that at the point of time when a preceding pulse was generated, means for extracting zero cross points of the input signal voltage or cross points at a predetermined constant level, and means for generating a pulse at the point of time when each of said variations reaches a predetermined level and at the point of time when each of said zero cross points is extracted.

6. A pulse modulation system as set forth in claim 5, wherein the output pulse generation interval is made longer than a predetermined value by means for cutting off lines for a predetermined period of time subsequent to the point of time when a preceding pulse was generated.

7. A pulse modulation system, comprising means for forming a stepped wave from an output pulse train, means for determining the voltage difference between an input signal voltage and said stepped wave, means for extracting zero cross points of said input signal voltage or cross points at a predetermined constant level, and means for generating a pulse at the point of time when said voltage difference reaches a predetermined value and at the point of time when each of said cross points is extracted.

8. A pulse modulation system as set forth in claim 7, wherein the output pulse generation interval is made longer than a predetermined value by means for cutting off lines for a predetermined period subsequent to the point of time when a preceding pulse was generated.

References Cited
UNITED STATES PATENTS

| 2,662,118 | 12/1953 | Schouten et al. | 325—143 |
| 2,744,959 | 5/1956 | Greefkes et al. | 325—143 XR |
| 2,897,275 | 7/1959 | Bowers | 322—9 XR |
| 2,889,521 | 6/1959 | Levine et al. | 332—9 |
| 3,013,159 | 12/1961 | De Sautels | 307—235 |
| 3,274,497 | 9/1966 | Zimmerman | 328—150 XR |
| 3,408,581 | 10/1968 | Wakamoto et al. | 307—262 XR |

JOHN S. HEYMAN, Primary Examiner

STANLEY T. KRAWCZEWICZ, Assistant Examiner

U.S. Cl. X.R.

179—15; 307—235, 262; 325—143; 332—9; 328—57, 59, 115, 118, 165